(12) United States Patent
Kim et al.

(10) Patent No.: US 10,505,643 B2
(45) Date of Patent: Dec. 10, 2019

(54) METHOD AND DEVICE FOR ESTIMATING DOPPLER FREQUENCY BY USING BEAM SCANNING PROCESS IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 15/561,384

(22) PCT Filed: Mar. 23, 2016

(86) PCT No.: PCT/KR2016/002917
§ 371 (c)(1),
(2) Date: Sep. 25, 2017

(87) PCT Pub. No.: WO2016/153265
PCT Pub. Date: Sep. 29, 2016

(65) Prior Publication Data
US 2018/0083719 A1    Mar. 22, 2018

Related U.S. Application Data

(60) Provisional application No. 62/138,418, filed on Mar. 26, 2015.

(51) Int. Cl.
*H04B 17/10* (2015.01)
*H04B 7/04* (2017.01)
(Continued)

(52) U.S. Cl.
CPC ............ *H04B 17/104* (2015.01); *H04B 7/04* (2013.01); *H04B 7/0617* (2013.01); *H04L 25/02* (2013.01);
(Continued)

(58) Field of Classification Search
CPC ............ H04L 25/02; H04L 25/03; H04B 7/04
See application file for complete search history.

(56) References Cited

U.S. PATENT DOCUMENTS 4,899,160 A * 2/1990 Kuwahara ............... G01S 1/042
342/372
5,053,630 A * 10/1991 Hausamann ............. G01P 5/26
250/574

(Continued)

FOREIGN PATENT DOCUMENTS

EP              3229382 A1 * 10/2017
WO      WO 2016089122 A1 * 6/2016      ............... H04B 7/04
(Continued)

*Primary Examiner* — Berhanu Tadese
(74) *Attorney, Agent, or Firm* — Birch, Stewart, Kolasch & Birch, LLP

(57) ABSTRACT

Provided is a method for estimating a Doppler frequency in a wireless communication system that operates in a millimeter wave (mmWave) bandwidth. A receiver implements a beam scanning process by using a plurality of preambles corresponding respectively to a plurality of beams to which mutually different beam forming is applied, and estimates a Doppler frequency for each of the plurality of beams. The plurality of preambles may correspond respectively to the beam forming directions of the plurality of beams.

12 Claims, 17 Drawing Sheets

(51) Int. Cl.
    *H04L 25/02*     (2006.01)
    *H04B 7/06*     (2006.01)
    *H04B 17/318*     (2015.01)

(52) U.S. Cl.
    CPC ........ *H04L 25/0222* (2013.01); *H04B 7/0695* (2013.01); *H04B 17/318* (2015.01)

(56) References Cited

U.S. PATENT DOCUMENTS

| | | | | |
|---|---|---|---|---|
| 5,200,755 A * | 4/1993 | Matsuda | | G01S 13/003 342/158 |
| 6,184,828 B1 * | 2/2001 | Shoki | | H01Q 3/26 342/372 |
| 6,675,013 B1 * | 1/2004 | Gross | | H04B 7/18504 455/11.1 |
| 6,788,661 B1 * | 9/2004 | Ylitalo | | H04B 7/0617 342/359 |
| 7,010,048 B1 * | 3/2006 | Shattil | | H04B 1/7174 375/130 |
| 7,349,483 B2 * | 3/2008 | Seki | | H04B 7/01 375/147 |
| 7,974,364 B2 * | 7/2011 | Yousef | | H04L 25/0212 375/316 |
| 8,320,301 B2 * | 11/2012 | Walton | | H04B 7/022 370/328 |
| 8,542,555 B1 * | 9/2013 | Uzes | | G01S 3/143 367/87 |
| 9,735,842 B2 * | 8/2017 | Kim | | H04B 7/01 |
| 9,763,254 B2 * | 9/2017 | Cordeiro | | H04W 72/048 |
| 10,069,547 B2 * | 9/2018 | Wang | | H04B 7/0456 |
| 2004/0015308 A1 * | 1/2004 | Lee | | H04B 7/01 702/75 |
| 2004/0125873 A1 * | 7/2004 | Han | | H04L 27/0014 375/226 |
| 2005/0157683 A1 * | 7/2005 | Ylitalo | | H04B 7/0634 370/334 |
| 2005/0259621 A1 * | 11/2005 | Lee | | H04B 1/7113 370/335 |
| 2006/0220956 A1 * | 10/2006 | Richardson | | G01S 7/2813 342/375 |
| 2008/0101306 A1 * | 5/2008 | Bertrand | | H04L 27/2613 370/336 |
| 2008/0240031 A1 * | 10/2008 | Nassiri-Toussi | | H04B 7/0408 370/329 |
| 2009/0122715 A1 * | 5/2009 | Lakkis | | H04B 7/0617 370/252 |
| 2009/0202021 A1 * | 8/2009 | Cheng | | H04L 1/0027 375/317 |
| 2009/0232063 A1 * | 9/2009 | Cordeiro | | H01Q 3/26 370/329 |
| 2009/0323563 A1 * | 12/2009 | Ho | | H04B 7/061 370/280 |
| 2009/0323789 A1 * | 12/2009 | Ragab | | H04L 25/0224 375/224 |
| 2010/0309793 A1 * | 12/2010 | Choi | | H04L 1/0016 370/252 |
| 2011/0128909 A1 * | 6/2011 | Luo | | H04L 5/0023 370/328 |
| 2011/0140952 A1 * | 6/2011 | Kemkemian | | G01S 13/426 342/146 |
| 2011/0160941 A1 * | 6/2011 | Garrec | | G01S 13/913 701/17 |
| 2011/0287778 A1 * | 11/2011 | Levin | | G01S 5/0252 455/456.1 |
| 2012/0044922 A1 * | 2/2012 | Ishii | | H04L 5/001 370/338 |
| 2012/0083299 A1 * | 4/2012 | Kruglick | | H04B 7/01 455/501 |
| 2012/0120870 A1 * | 5/2012 | Bardout | | H04B 7/1851 370/326 |
| 2013/0258972 A1 * | 10/2013 | Kim | | H04B 7/0617 370/329 |
| 2014/0098912 A1 * | 4/2014 | Yin | | H04B 7/0417 375/345 |
| 2014/0177607 A1 * | 6/2014 | Li | | H04B 7/0617 370/336 |
| 2014/0230567 A1 * | 8/2014 | Rowe | | G01F 1/667 73/861.25 |
| 2014/0254515 A1 * | 9/2014 | Kim | | H04W 74/0833 370/329 |
| 2014/0301336 A1 * | 10/2014 | Kim | | H04L 5/001 370/329 |
| 2014/0321430 A1 * | 10/2014 | Bakker | | H04W 36/0033 370/331 |
| 2014/0355707 A1 * | 12/2014 | Kim | | H04B 7/0469 375/267 |
| 2015/0009951 A1 * | 1/2015 | Josiam | | H04L 25/0224 370/330 |
| 2015/0249526 A1 * | 9/2015 | Kim | | H04L 5/0051 370/329 |
| 2015/0288425 A1 * | 10/2015 | Kim | | H04L 27/2657 370/329 |
| 2016/0021548 A1 * | 1/2016 | Raghavan | | H04W 16/28 370/329 |
| 2016/0044517 A1 * | 2/2016 | Raghavan | | H04W 16/28 370/329 |
| 2016/0190707 A1 * | 6/2016 | Park | | H01Q 1/246 370/334 |
| 2016/0205677 A1 * | 7/2016 | Kim | | H04L 5/0051 370/329 |
| 2016/0241308 A1 * | 8/2016 | Kim | | H04L 5/0048 |
| 2016/0282450 A1 * | 9/2016 | Kishigami | | G01S 7/285 |
| 2017/0006638 A1 * | 1/2017 | Sahlin | | H04J 13/107 |
| 2017/0031013 A1 * | 2/2017 | Halbert | | G01S 7/003 |
| 2017/0033853 A1 * | 2/2017 | Kim | | H04B 7/0417 |
| 2017/0078001 A1 * | 3/2017 | Kim | | H04B 7/0626 |
| 2017/0111149 A1 * | 4/2017 | Kim | | H04L 5/0048 |
| 2017/0134083 A1 * | 5/2017 | Kim | | H04B 7/0456 |
| 2017/0208588 A1 * | 7/2017 | Park | | H04W 72/0446 |
| 2017/0272223 A1 * | 9/2017 | Kim | | H04B 7/0617 |
| 2017/0273063 A1 * | 9/2017 | Kim | | H04W 72/046 |
| 2017/0276769 A1 * | 9/2017 | Kishigami | | G01S 7/282 |
| 2017/0329002 A1 * | 11/2017 | Koerber | | H01Q 1/3233 |
| 2017/0331577 A1 * | 11/2017 | Parkvall | | H04J 11/0079 |
| 2017/0331670 A1 * | 11/2017 | Parkvall | | H04W 52/0274 |
| 2017/0366996 A1 * | 12/2017 | Park | | H04W 48/08 |
| 2017/0367120 A1 * | 12/2017 | Murray | | H04B 7/0695 |
| 2018/0007574 A1 * | 1/2018 | Park | | H04B 7/04 |
| 2018/0034525 A1 * | 2/2018 | Park | | H04L 5/00 |
| 2018/0041262 A1 * | 2/2018 | Kang | | H04B 7/063 |
| 2018/0048413 A1 * | 2/2018 | Liu | | H04J 11/0069 |
| 2018/0054244 A1 * | 2/2018 | Kim | | G01S 7/52095 |
| 2018/0067203 A1 * | 3/2018 | Lee | | G01S 5/0205 |
| 2018/0074181 A1 * | 3/2018 | Kishigami | | G01S 7/282 |
| 2018/0076520 A1 * | 3/2018 | Ma | | G01S 13/74 |
| 2018/0076870 A1 * | 3/2018 | Kim | | H04B 7/04 |
| 2018/0083719 A1 * | 3/2018 | Kim | | H04B 7/04 |
| 2018/0092129 A1 * | 3/2018 | Guo | | H04L 5/0048 |
| 2018/0097591 A1 * | 4/2018 | Islam | | H04L 5/0023 |
| 2018/0102817 A1 * | 4/2018 | Park | | H04B 7/04 |
| 2018/0115357 A1 * | 4/2018 | Park | | H04B 7/04 |
| 2018/0115990 A1 * | 4/2018 | Abedini | | H04W 74/006 |
| 2018/0138962 A1 * | 5/2018 | Islam | | H04L 5/0048 |
| 2018/0139787 A1 * | 5/2018 | Islam | | H04B 7/0626 |
| 2018/0145808 A1 * | 5/2018 | Kim | | H04B 7/04 |
| 2018/0167979 A1 * | 6/2018 | Guo | | H04W 16/28 |
| 2018/0191417 A1 * | 7/2018 | Kim | | H04B 7/04 |
| 2018/0198510 A1 * | 7/2018 | Park | | H04B 7/04 |
| 2018/0212800 A1 * | 7/2018 | Park | | H04L 1/00 |
| 2018/0224547 A1 * | 8/2018 | Crouch | | G01S 17/102 |
| 2018/0241464 A1 * | 8/2018 | Michaels | | H04B 7/0617 |

FOREIGN PATENT DOCUMENTS

| | | | | |
|---|---|---|---|---|
| WO | WO-2016153152 A1 * | 9/2016 | ........... | H04B 7/0408 |
| WO | WO 2016153265 A1 * | 9/2016 | ........... | H04B 7/04 |
| WO | WO 2017061679 A1 * | 4/2017 | ........... | H04B 7/04 |

* cited by examiner

METHOD AND DEVICE FOR ESTIMATING DOPPLER FREQUENCY BY USING BEAM SCANNING PROCESS IN WIRELESS COMMUNICATION SYSTEM

CROSS REFERENCE TO RELATED APPLICATIONS

This application is the National Phase of PCT/KR2016/002917 filed on Mar. 23, 2016, which claims priority under 35 U.S.C. § 119(e) to U.S. Provisional Application No. 62/138,418 filed on Mar. 26, 2015, all of which are hereby expressly incorporated by reference into the present application.

BACKGROUND OF THE INVENTION

Field of the Invention

The present invention relates to wireless communication and, more particularly, to a method and apparatus for estimating a Doppler frequency by using a beam scanning process in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, due to the rapid spread of mobile smart devices and the emergence of big data, mobile traffic is expected to be doubled every year and increased more than 1000 times in 10 years. The burden of mobile network operators have been increased due to the explosion of mobile traffic, and existing 4G mobile communication systems with limited additional frequency coverage cannot accommodate the explosive mobile traffic. Therefore, the development of 5th generation mobile communication technology based on millimeter wave (mmWave) capable of securing broadband is being discussed. The millimeter wave is a frequency band of 30-300 GHz which is generally called extremely high frequency (EHF) band and has its wavelength of 1 cm to 1 mm. The wave with the wavelength is in the middle of the currently used radio frequency band and the infrared ray (its wavelength about 0.1 mm), and it is very close to the light and is used in high resolution radar and microwave spectroscopy. The millimeter wave has less diffraction properties and larger directive properties than the conventional communication wave, and has larger diffraction properties, and less directive properties than the laser beam. When millimeter waves are used for communication, it is considered that ultra-multiple communications is possible in that far exceeds the microwave communication capacity, but there is large transmission loss in the spatial transmission. This is because the energy absorption by the oxygen and water molecules in the atmosphere is relatively large compared to the existing cellular frequency, resulting in high path loss.

Due to the characteristics of millimeter waves, various communication methods are expected to change. For example, the base station can collect the electric power for emitting the millimeter wave in a specific direction and use it as a beam. In addition, a wireless communication system with ultra-high frequencies operated in a millimeter wave band has a center frequency ranging from several GHz to several tens of GHz, unlike the conventional wireless communication system, and thus Doppler effect caused by movement in a user equipment, and influence of the carrier frequency offset caused by the oscillator error can be further increased. Therefore, various methods for efficient communication in the millimeter wave band may be required.

SUMMARY OF THE INVENTION

The present invention provides a method and apparatus for estimating a Doppler frequency by using a beam scanning process in a wireless communication system. The present invention provides a method and apparatus for estimating the Doppler frequency for each analog beam by using an analog beam scanning preamble. The present invention also provides a specific method and apparatus for setting an oscillator of a receiver by using the derived Doppler frequency and an index of an analog beam.

In an aspect, a method for estimating a Doppler frequency by a receiver in a wireless communication system is provided. The method includes performing a beam scanning process by using a plurality of preambles corresponding to each of a plurality of beams to which different beam forming are applied, and estimating the Doppler frequency for each of the plurality beams.

In another aspect, a receiver in a wireless communication system is provided. The receiver includes a memory, a transceiver, and a processor, coupled to the memory and the transceiver, that performs a beam scanning process by using a plurality of preambles corresponding to each of a plurality of beams to which different beam forming are applied, and estimates the Doppler frequency for each of the plurality beams.

It is available to efficiently compensate the Doppler shift occurring in the millimeter wave band.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
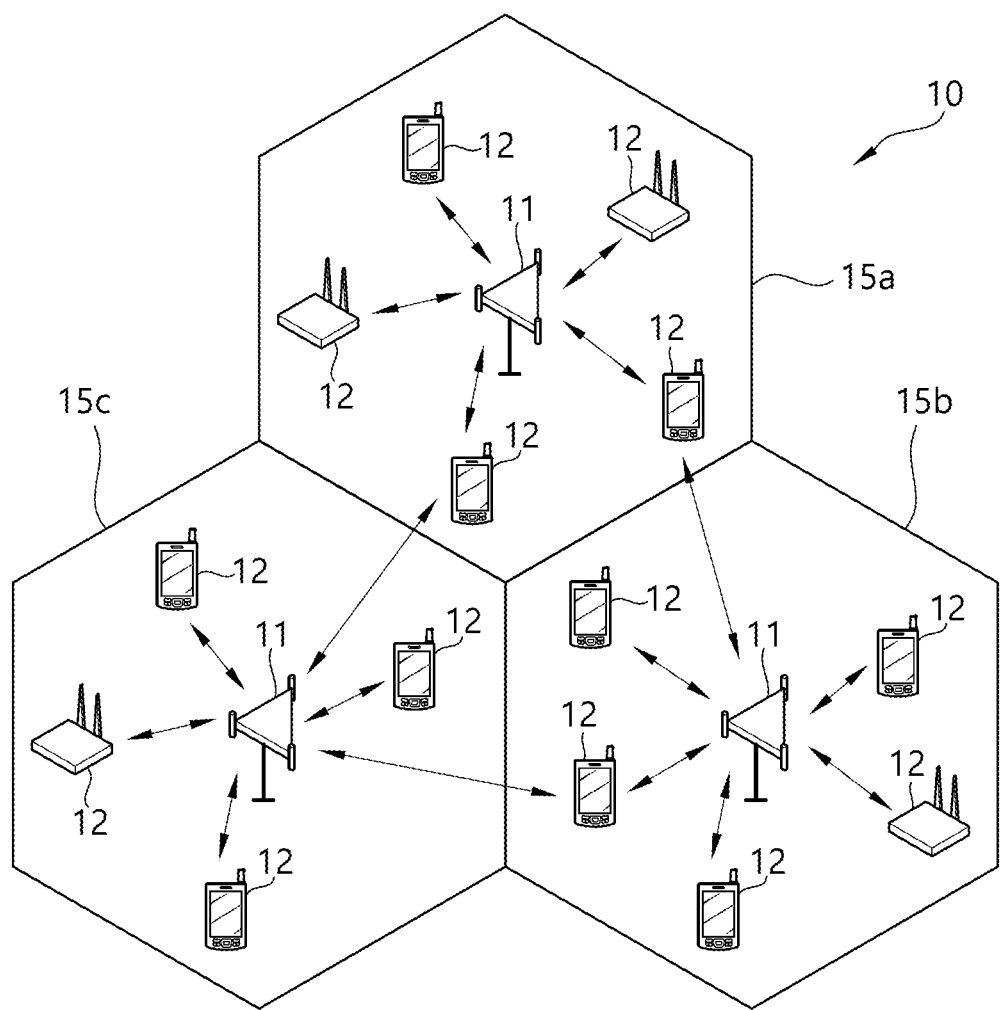
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. An eNB providing a communication service to the serving cell is called a serving eNB. The cellular system includes a different cell adjacent to the serving cell. The different cell adjacent to the serving cell is called a neighbor cell. An eNB providing a communication service to the neighbor cell is called a neighbor eNB. The serving cell and the neighbor cell are relatively determined based on a UE.

This technique can be used for downlink (DL) or uplink (UL). In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
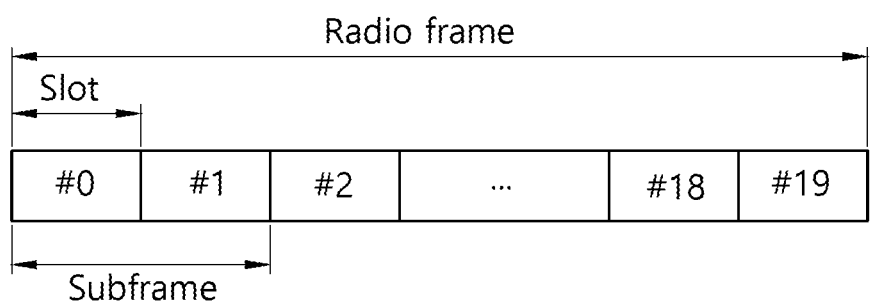
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The need for hybrid beam forming will be described. Beamforming technology using multiple antennas may be broadly divided into analog beam forming technology (hereinafter, "analog beam forming") and digital beam forming technology (hereinafter, "digital beam forming") depending on where a beam forming weight vector (or precoding vector) is applied.

Figure 3:
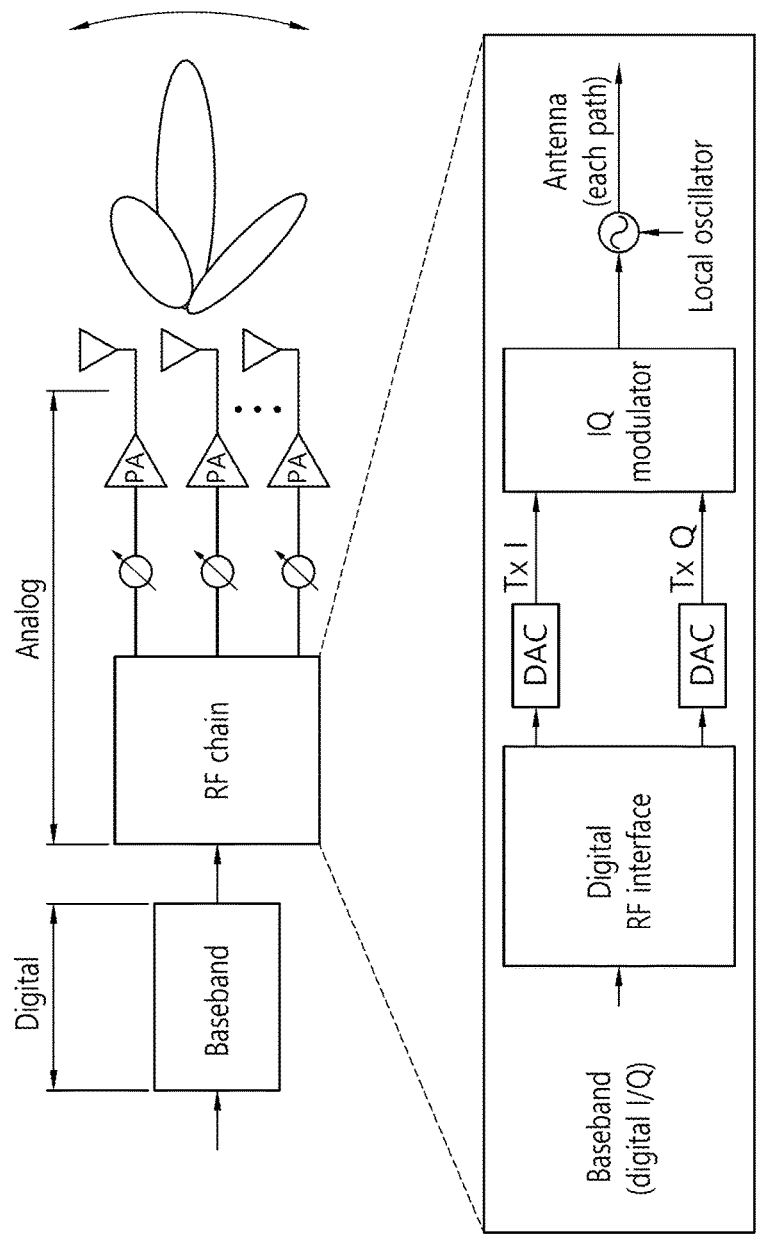
FIG. 3 is a block diagram of a transmitter including an analog beamformer and a radio frequency (RF) chain.

FIG. 3 is a block diagram of a transmitter including an analog beamformer and a radio frequency (RF) chain. Analog beam forming is a typical beam forming technique applied to earlier multi-antenna structures. In analog beam forming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beam forming, beam precision is determined by the element characteristics of the PS and PA, and the control characteristics of the element make analog beam forming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
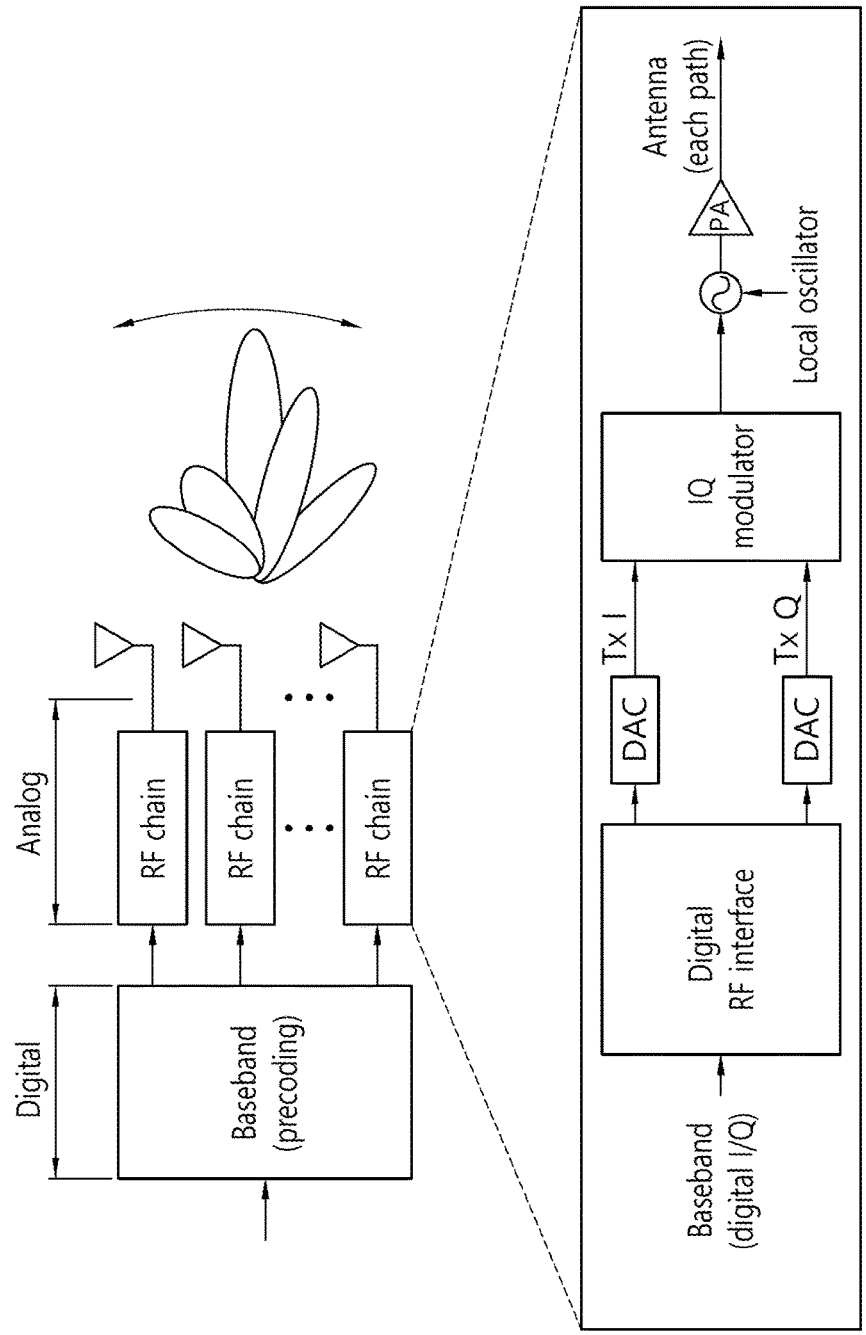
FIG. 4 is a block diagram of a transmitter including a digital beamformer and a RF chain.

FIG. 4 is a block diagram of a transmitter including a digital beamformer and a RF chain. In digital beam forming, as opposed to analog beam forming, a beam is formed in the digital stage by a baseband process, in order to maximize diversity and multiplexing gain in an MIMO environment. Referring to FIG. 4, a beam may be formed by implementing precoding in the baseband process. The RF chains may include PAs. Hence, complex weights generated for beam forming may be applied directly to transmitted data. Digital beam forming may support simultaneous multi-user beam forming because a different beam may be formed for each user. Moreover, digital beam forming allows for forming an independent beam for each user to whom a resource is orthogonally allocated, thus providing high scheduling flexibility and enabling to operate the transmitting end according to a system purpose. In digital beam forming, when a technology such as MIMO-OFDM is used in a broadband transmission environment, an independent beam may be formed per subcarrier. Thus, digital beam forming may optimize the maximum data rate of a single user on the basis of increased system capacity and greater beam gain. Therefore, digital beam forming-based MIMO technology was adopted to 3G/4G systems.

Table 1 shows the relationship between performance gain and complexity of analog beam forming and digital beam forming.

TABLE 1

| | Ease of beam forming precision control | Multi-carrier beam control | Multi-stream transmission | Hardware complexity (BB process) | Pilot and feedback overhead |
|---|---|---|---|---|---|
| Analog beam forming | Low (related to PA/PS element characteristics) | Not available or difficult | Not available or difficult | Low | Low |
| Digital beam forming | High | Available | Available | High | High |

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beam forming is used in a massive MIMO environment, digital signal processing should be implemented for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for, massive MIMO channels of all antennas, thus considerably increasing pilot and feedback overhead. In contrast, when conventional analog beam forming is used in a massive MIMO environment, the hardware complexity at the transmitting end is relatively low, but the performance increase through the use of multiple antennas is only slight and the flexibility of resource allocation may be reduced. Especially in broadband transmission, it is very hard to implement beam control for each frequency.

Accordingly, massive MIMO environments require hybrid beam forming, a combination of analog beam forming and digital beam forming, rather than using either analog beam forming or digital beam forming as a beam forming technology. That is, a hybrid-type transmitting end structure may be needed so as to lower the complexity of hardware implementation at the transmitting end according to the characteristics of analog beam forming and to maximize beam forming gain using a large number of transmit antennas according to the characteristics of digital beam forming.

Hybrid beam forming will be described. As described above, the purpose of hybrid beam forming is to configure a transmitting end that provides the benefits of analog beam forming and the benefits of digital beam forming in a massive MIMO environment.

Figure 5:
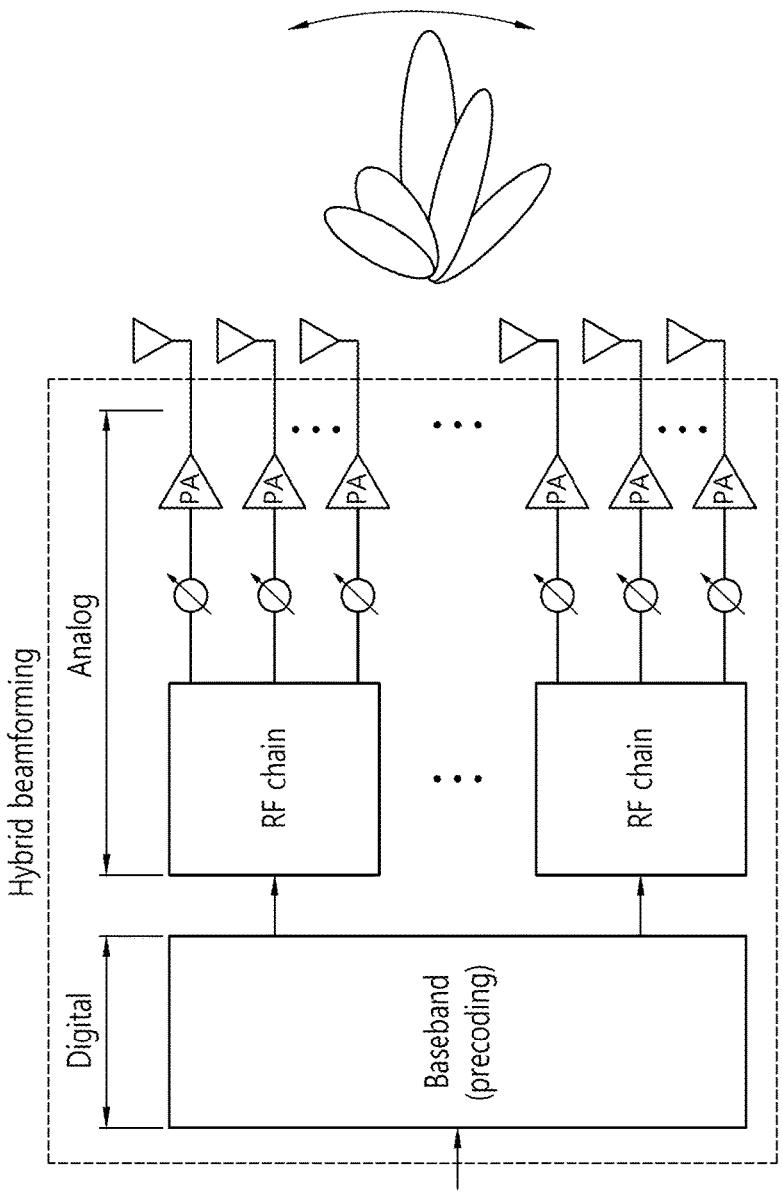
FIG. 5 is a block diagram of a transmitter including a hybrid beamformer.

FIG. 5 is a block diagram of a transmitter including a hybrid beamformer. Referring to FIG. 5, hybrid beam forming may basically allow for forming a coarse beam through analog beam forming and then a beam for multi-stream or multi-user transmission through digital beam forming. That is, hybrid beam forming exploits both analog beam forming and digital beam forming in order to lower the complexity of implementation at the transmitting end or hardware complexity.

Doppler effect is described in the millimeter wave (mm-Wave) band. In general, the Doppler effect is linearly increased with the center frequency. Since the millimeter wave band has a center frequency larger than that of the conventional cellular band, the Doppler effect is significantly implemented. Doppler spreading phenomenon plays a major role when a UE moves at high speed or moves at a low speed in a high frequency band. The Doppler spreading causes spread in the frequency domain, resulting in distortion of the signal. The Doppler spreading can be expressed as $f_{Doppler}=(v/\lambda)\cos\theta$; In this case, v is a moving speed of the UE, and $\lambda$, is the wavelength of the center frequency of the radio wave transmitted by the base station or transmitted by the UE. $\theta$ is the angle between the received radio wave and the moving direction of the UE. In the following description, it is assumed that $\theta=0$. Meanwhile, the relationship between the coherence time and the Doppler spread, which means a time interval in which the correlation value of the channel response in the time domain is 50% or more, can be expressed by Equation 1.

$$T_c = \sqrt{\frac{9}{16\pi f_{doppler}}} = \frac{0.423}{f_{doppler}} \quad \langle\text{Equation 1}\rangle$$

Figure 6:
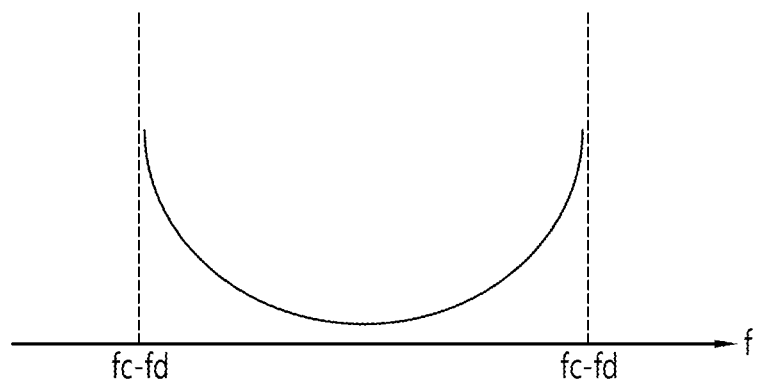
FIG. 6 shows an example of the Doppler power spectral density.

FIG. 6 shows an example of the Doppler power spectral density. The Doppler power spectral density (hereinafter, the Doppler spectrum) may have various shapes. Generally, in a rich scattering environment such as a downtown region, the Doppler spectrum is shown as a U-shape if the received signal is received at the same power in all directions. Referring to FIG. 6, if the center frequency is fc and the maximum Doppler spread value is fd, then the Doppler spectrum has the U-shape.

Meanwhile, since in a wireless communication system with ultra-high frequency, its center frequency is located in a band with a very high center frequency, it has advantages capable of installing several small antennas in a small space. With these advantages, narrow beam forming (or, it has the same meaning as a pin-point beam forming, pencil beam forming, sharp beam shaping, and sharp beam shaping) can be implemented with tens to hundreds of antennas. The narrow beam forming means that the signal is not received in the omni-direction but is only received at a certain angle.

Figure 7:
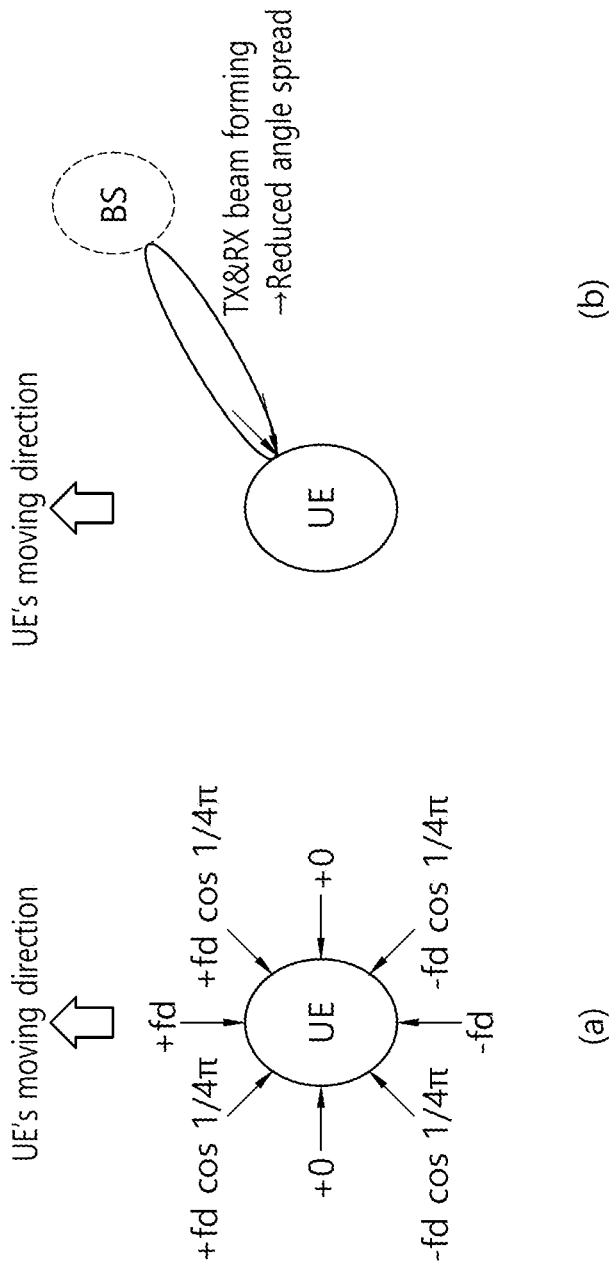
FIG. 7 shows a case where a signal is received in the omni-direction and a case in which the signal is received only at a certain angle.

FIG. 7 shows a case where a signal is received in the omni-direction and a case in which the signal is received only at a certain angle. Referring to FIG. 7-(*a*), when a signal is received in the omni-direction, the Doppler spreading differs according to the moving direction of the UE. For example, a signal received in the moving direction of the UE is the Doppler spread by +fd, and a signal received in the direction opposite to the moving direction of the UE is the Doppler spread by −fd. In this case, the U-shaped Doppler spectrum shown in FIG. 6 is shown. Meanwhile, referring to FIG. 7-(*b*), when the narrow beam forming is performed by using a plurality of antennas, the angular spread is reduced as compared with a case where signals are received in the omni-direction.

Figure 8:
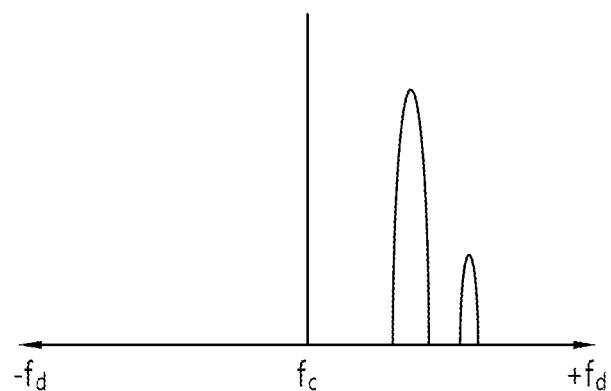
FIG. 8 shows the Doppler spectrum when the narrow beam forming is performed.

FIG. 8 shows the Doppler spectrum when the narrow beam forming is performed. Referring to FIG. 8, when the narrow beam forming is performed so that a signal is not incident to the receiver in the omni-direction but is only incident at a narrow angle, the Doppler spectrum does not have the U-shape, and has the Doppler spread only at a certain band due to the reduced spread.

The carrier frequency offset (CFO) is described in the millimeter wave (mmWave) band. The CFO caused by the oscillator error between the UE and the base station is expressed as ppm (=$10^{-6}$), which also has a linearly increasing characteristic with respect to the center frequency. In order to solve the CFO problem, in the conventional cellular network, a base station transmits a synchronization channel, and a pilot signal, or a reference symbol, and the UE uses it to estimate and compensate the CFO. In a microwave wireless communication system with ultra-high frequency, the CFO is significantly implemented than that of the conventional cellular network, and thus, the synchronization channel needs to be transmitted differently to estimate and compensate the CFO.

In the conventional LTE/LTE-A system, the error of the oscillator between the UE and the base station is defined as a requirement. The error of the oscillator on the UE side should be within ±0.1 ppm, compared with the carrier frequency received from the base station observed during one slot (0.5 ms). The error of the oscillator on the base station side indicates the difference between the allocated frequency and the actual transmission frequency, and the accuracy of the oscillator is set differently according to a type of the base station as shown in Table 2.

TABLE 2

| BS Type | Accuracy |
| --- | --- |
| Wide area BS | ±0.05 ppm |
| Local area BS | ±0.1 ppm |
| Home BS | ±0.25 ppm |

Therefore, assuming that the base station is a local area BS, the maximum difference of the oscillator error between the base station and the UE is ±0.1 ppm, and when the error occurs in one direction, the maximum of 0.2 ppm of the CFO occurs. These CFOs in ppm units are converted in Hz units (center frequency×CFO (ppm)). On the other hand, in the OFDM system, the influence of the CFO varies depending on the subcarrier spacing. For example, in an OFDM system with large subcarrier spacing, the influence of a large CFO is relatively small. Therefore, it is necessary to express the absolute value of the CFO as a relative value that affects the actual OFDM system, which is called a normalized CFO. The normalized CFO can be expressed in (CFO (Hz)/subcarrier spacing). Table 3 shows the CFO's absolute value and normalized CFO for the center frequency and oscillator error.

TABLE 2

| Center frequency (Subcarrier spacing) | Oscillator error | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

Referring to Table 3, for the center frequency of 2 GHz, a subcarrier spacing of 15 kHz used in 3GPP LTE rel-8/9/10 is assumed. For the center frequencies of 30 GHz and 60 GHz, the subcarrier spacing of 104.25 kHz was assumed to avoid performance degradation by considering the Doppler effect. However, this is merely an example, and it is apparent that different subcarrier spacing may be applied at each center frequency.

Referring to the above mentioned description, in the wireless communication system in the millimeter wave band, the influence of the Doppler effect and the CFO may be significantly implemented as high center frequency is used. Also, due to the narrow beam forming that can be applied in the millimeter wave band, the Doppler spectrum does not have the conventional U shape, and Doppler spreading can occur only in a certain band. Accordingly, it can be deduced that the Doppler spread will be different depending on the characteristics of each beam, on the other hand, in order to apply various beam forming techniques by using differences between Doppler shifts for each beam, estimation of the Doppler shift for each beam is essential.

Hereinafter, a method of estimating the Doppler frequency or Doppler shift for each beam using the preamble during the beam scanning process using the beam scanning characteristic will be described according to an embodiment of the present invention. In the following description, a method for estimating the Doppler frequency or Doppler shift (i.e. CFO) for each analog beam in consideration of an analog beam scanning characteristic composed of a hybrid beam former will be described in detail. However, this is only an example for convenience of explanation. The present invention can be applied not only to an analog beam former and a hybrid beam former but also to a general digital beam former and a full-dimension MIMO (FD-MIMO).

First, described is a method of estimating by a UE a Doppler frequency and/or a Doppler shift (i.e. CFO) for each beam, in accordance with a phenomenon that the Doppler spectrum shifts only to a certain band by beam forming according to an embodiment of the present invention. More specifically, firstly the UE performs a beam scanning process for different K preambles in the time axis to which different K beam formings are applied. Then, the UE estimates the Doppler frequency and/or the Doppler shift of the received signal for each preamble (i.e. for each beam).

Figure 9:
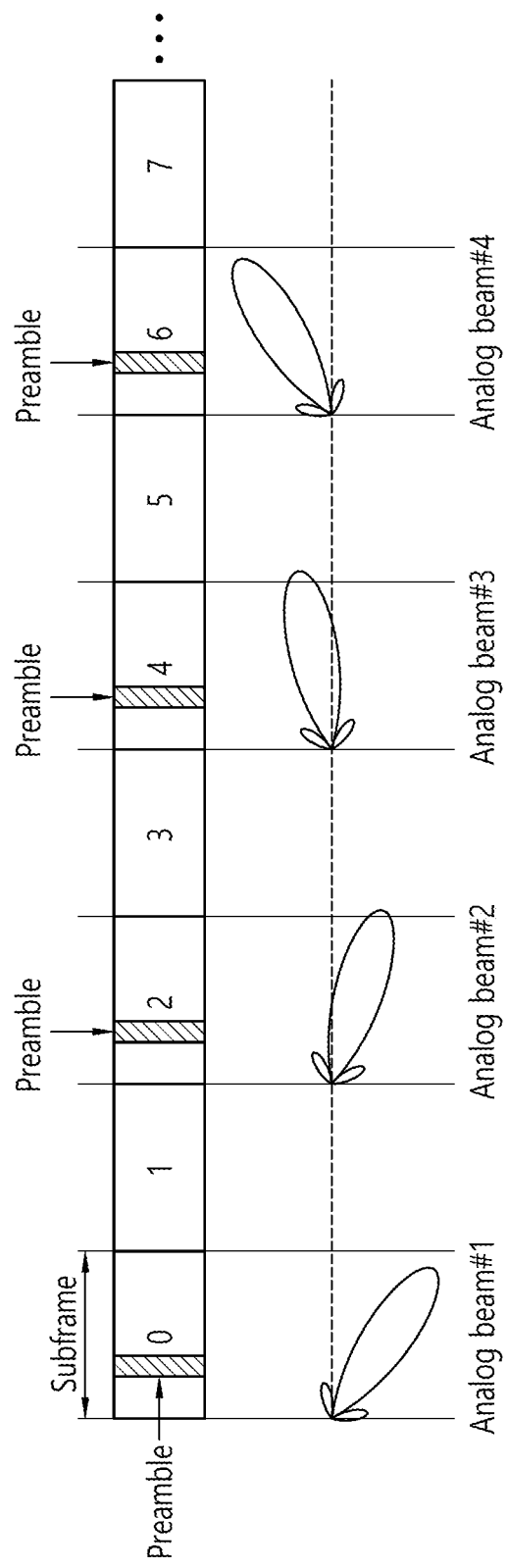
FIG. 9 shows an example of performing a beam scanning process for each preamble according to an embodiment of the present invention.

FIG. 9 shows an example of performing a beam scanning process for each preamble according to an embodiment of the present invention. Referring to FIG. 9, it is assumed that four preambles for all four beam scans are configured, and a corresponding individual beam forming direction is set for each preamble. The preamble for scanning beam #1 is assigned to subframe #0, the preamble for scanning beam #2 is assigned to subframe #2, the preamble for scanning beam #3 is assigned to subframe #4, and the preamble for scanning beam #4 is assigned to subframe #6.

Figure 10:
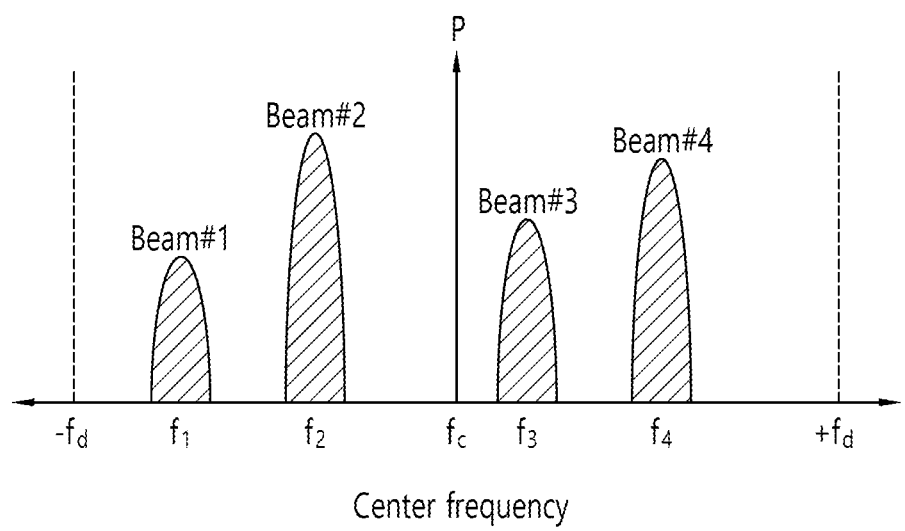
FIG. 10 shows an example of the Doppler spectrum having different Doppler shifts for each beam according to an embodiment of the present invention.

FIG. 10 shows an example of the Doppler spectrum having different Doppler shifts for each beam according to an embodiment of the present invention. FIG. 10 shows the Doppler spectrum corresponding to the scanned beams #1 to #4 of FIG. 9. The UE estimates the Doppler frequency and/or the Doppler shift of the received signal for each scanned beam. When an ultra-high carrier such as a millimeter-wave band is used, a difference in Doppler shift is apparent for each beam.

Table 4 shows the Doppler frequency and Doppler shift corresponding to the K beam indexes

TABLE 4

| Beam index | Doppler frequency | Doppler shift (CFO) |
|---|---|---|
| 1 | $f_1$ | $\varepsilon_1$ |
| 2 | $f_2$ | $\varepsilon_2$ |
| 3 | $f_3$ | $\varepsilon_3$ |
| ... | ... | ... |
| K | $f_K$ | $\varepsilon_K$ |

As described above, the UE can estimate the Doppler frequency and/or Doppler shift of the received signal for each scanned beam. First, the UE can estimate the Doppler frequency of the received signal. The UE can directly estimate the Doppler frequency by calculating the Doppler spectrum in the preamble interval of each beam. In this case, if the Doppler shift of each beam does not occur or its difference is small, then the Doppler frequency estimated through the corresponding beam may be equal to the center frequency estimated through the reference synchronization signal or the reference preamble. In order to estimate the Doppler spectrum, various algorithms can be used, for example, if autocorrelation-based general technique will be described, then the Doppler spectrum for an input signal x can be obtained by implementing Fourier transform on the autocorrelation function for the signal x.

Figure 11:
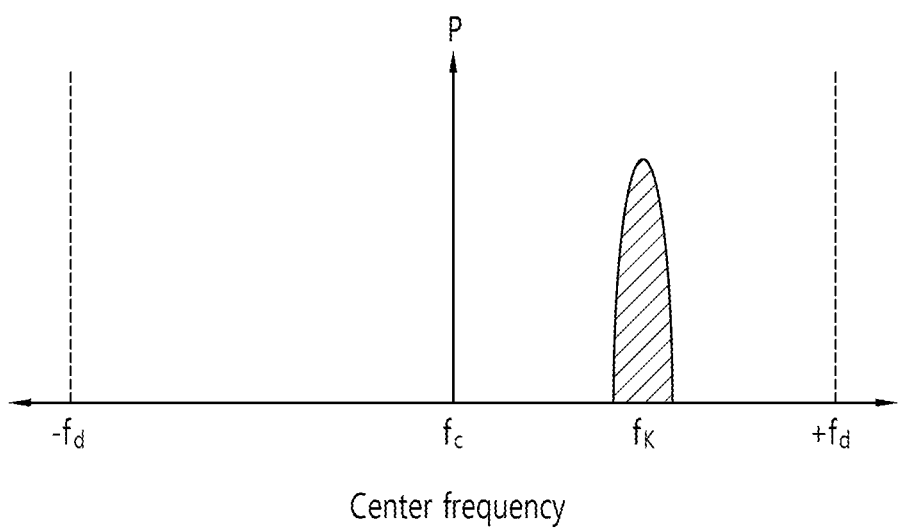
FIG. 11 shows an example of estimating the Doppler spectrum according to an embodiment of the present invention.

FIG. 11 shows an example of estimating the Doppler spectrum according to an embodiment of the present invention. Referring to FIG. 11, the Doppler frequency for beam #K is directly estimated from the calculated Doppler spectrum.

Alternatively, the UE may estimate the Doppler shift of the received signal. The UE estimates the Doppler shift (i.e. CFO) for each beam, and thus may estimate an offset from the currently synchronized center frequency. That is, the UE can directly estimate the relative CFO by using the corresponding preamble for beam scanning, rather than directly calculating the Doppler spectrum of each beam as described above. The shifted Doppler frequency of the corresponding beam finally can be known through the offset with the currently synchronized center frequency. Here, the preamble used for scanning each beam should have a repetition structure composed of at least two OFDM symbols in a time domain.

Each preamble can be expressed by Equation 2 at the receiving end.

$$r_k^n = H_k^n s_k^n \qquad \text{<Equation 2>}$$

In Equation 2, $r_k^n$ is a preamble received in the subcarrier k of the n-th OFDM symbol. $H_k^n$ is a channel in the subcarrier k of the n-th OFDM symbol. $s_k^n$ is the preamble sequence or pilot transmitted in the subcarrier k of the nth OFDM symbol. The Doppler shift (i.e. CFO) may be computed by using the preamble received by Equation 3.

$$\Delta \varepsilon = \text{angle}\left(\sum_{n=1}^{L-1} \sum_{k \in C} r_k^{n+1} (r_k^n)^*\right) \times \frac{N}{2\pi(N+N_g)} \qquad \text{<Equation 3>}$$

In Equation 3, N is an OFDM symbol period, Ng is a length of a CP, C is a set of all subcarriers carrying a preamble, and L is the length or number of OFDM symbols of the entire preamble. Assuming that the two channels adjacent to the same subcarrier k in Equation 3 are similar to each other and the sequence in the preamble is the same, the term in sigma ($\Sigma$) is simply expressed by Equation 4.

$$r_k^{n+1}(r_k^n)^* \approx H_k^{n+1} s_k^{n+1} (H_k^n s_k^n)^* e^{j2\pi\Delta\varepsilon(N+N_g)/N} \qquad \text{<Equation 4>}$$
$$= H_k^{n+1}(H_k^n)^* s_k^{n+1}(s_k^n)^* e^{j2\pi\Delta\varepsilon(N+N_g)/N}$$
$$= \rho e^{j2\pi\Delta\varepsilon(N+N_g)/N}$$

That is, the term in the sigma can be simplified with only the power p of the channel and the CFO $\Delta\varepsilon$ due to the phase shift. Assuming that the preamble for beam scanning is composed of two OFDM symbols (i.e. L=1), the CFO can finally be calculated by Equation 5.

$$\Delta \varepsilon_{beam} = \text{angle}\left(\sum_{k \in C} r_k^2 (r_k^1)^*\right) \times \frac{N}{2\pi(N+N_g)} \qquad \text{<Equation 5>}$$

As described above, the CFO can be obtained by the Equation 5 with the reception signal of the preamble. The finally calculated CFO can be directly reflected in the Doppler shift of Table 4, or the Doppler frequency may also be calculated directly by using the difference between the calculated CFO and the current synchronized center frequency. Table 5 shows the Doppler shift calculated corresponding to the K beam indexes and the Doppler frequency calculated from each Doppler shift.

TABLE 5

| Beam index | Doppler shift (CFO) | Doppler frequency |
|---|---|---|
| 1 | $\varepsilon_1 \ (=\Delta\varepsilon_{beam\#1})$ | $f_1 = f_c + \Delta\varepsilon_{beam\#1}$ |
| 2 | $\varepsilon_2$ | $f_2 = f_c + \Delta\varepsilon_{beam\#2}$ |
| 3 | $\varepsilon_3$ | $f_3 = f_c + \Delta\varepsilon_{beam\#3}$ |
| ... | ... | ... |
| K | $\varepsilon_K$ | $f_K = f_c + \Delta\varepsilon_{beam\#K}$ |

Hereinafter, a method of setting a frequency of an oscillator will be described, based on Doppler frequencies estimated for K different preambles corresponding to different K beam formings, according to an embodiment of the present invention. The UE can correct the Doppler shift by setting the frequency of the oscillator in various ways based on the estimated Doppler frequency for each beam. The UE can feed information on any one of the beam indexes back to the base station based on the estimated Doppler frequency for each beam. In this case, the UE can set the frequency of the oscillator by using one of two methods. First, the base station may instruct the UE to directly set the frequency of the oscillator, in consideration of the Doppler frequency of the corresponding beam, based on the information on the fed-back beam index. Alternatively, the UE may set the frequency of the oscillator to compensate the Doppler frequency corresponding to the beam index, independently of the indication of the base station, while feeding back information on any one of the beam indexes to the base station. As a result, the UE may set the frequency of the oscillator based on the Doppler frequency or the CFO corresponding to the selected beam index among the Doppler frequencies estimated through the K preambles.

For example, since the beam scanning process is necessarily implemented on the characteristic of the analog stage, the UE can estimate strength of each beam through a beam scanning process. In general, a UE may select a beam having the largest received signal strength from each beam and feed information on the corresponding beam index back to the base station. The base station may instruct the UE to directly set the frequency of the oscillator by considering the Doppler frequency of the corresponding beam, based on the information on the feedback beam index. Alternatively, the UE may set the frequency of the oscillator to compensate the Doppler frequency corresponding to the corresponding beam index independently of the instruction of the base station, while feeding the information on the index of the beam having the largest received signal strength back to the base station.

Hereinafter, various methods for setting the frequency of the oscillator will be described according to an embodiment of the present invention.

(1) Doppler shift correction corresponding to the selected beam index: For example, the frequency of the oscillator of the UE is set by correcting the Doppler shift corresponding to the selected beam index as it is. That is, the frequency of the finally set oscillator is $f_c'=f_{beam}$. In this case, $f_{beam}$ is the Doppler frequency corresponding to the selected beam index. The generally selected beam may be the beam having the largest received signal strength.

Figure 12:
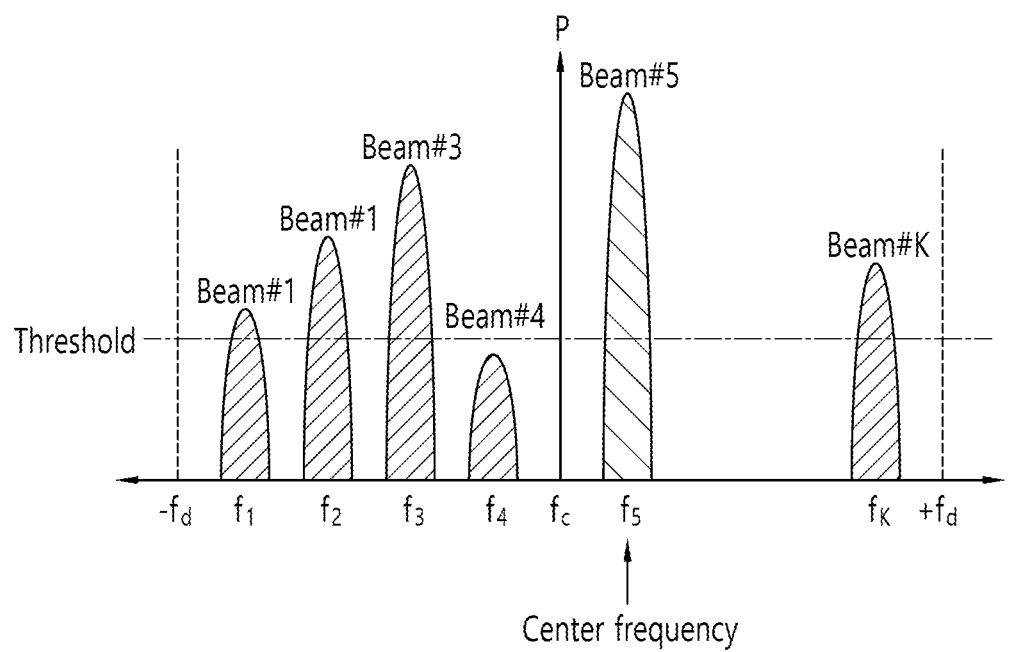
FIG. 12 shows an example of setting the frequency of an oscillator according to an embodiment of the present invention.

FIG. 12 shows an example of setting the frequency of an oscillator according to an embodiment of the present invention. FIG. 12 shows Doppler spectra for K beams according to beam scanning. As a result of the beam scanning, the Doppler frequencies corresponding to the respective beams are $f_1, f_2 \ldots f_K$, and the beam having the largest received signal strength is beam #5. Therefore, $f_{beam}=f_5$ in this embodiment. The UE feeds the index information of the beam #5 back to the base station, and the base station can instruct the UE to set the frequency of the oscillator to $f_5$ based on the index information of the fed-back beam #5. Alternatively, the UE can set the frequency of the oscillator to $f_5$, independently of the index information of the beam #5 fed back to the base station.

(2) Doppler shift correction corresponding to the intermediate value between the selected beam index and the existing center frequency: As another example, the frequency of the oscillator of the UE is set by correcting as the intermediate value between the Doppler frequency corresponding to the selected beam index and the existing center frequency. That is, the frequency of the finally set oscillator is $f_c'=(f_c+f_{beam})/2$. In this case, $f_{beam}$ is the Doppler frequency corresponding to the selected beam index. The generally selected beam may be the beam having the largest received signal strength.

Figure 13:
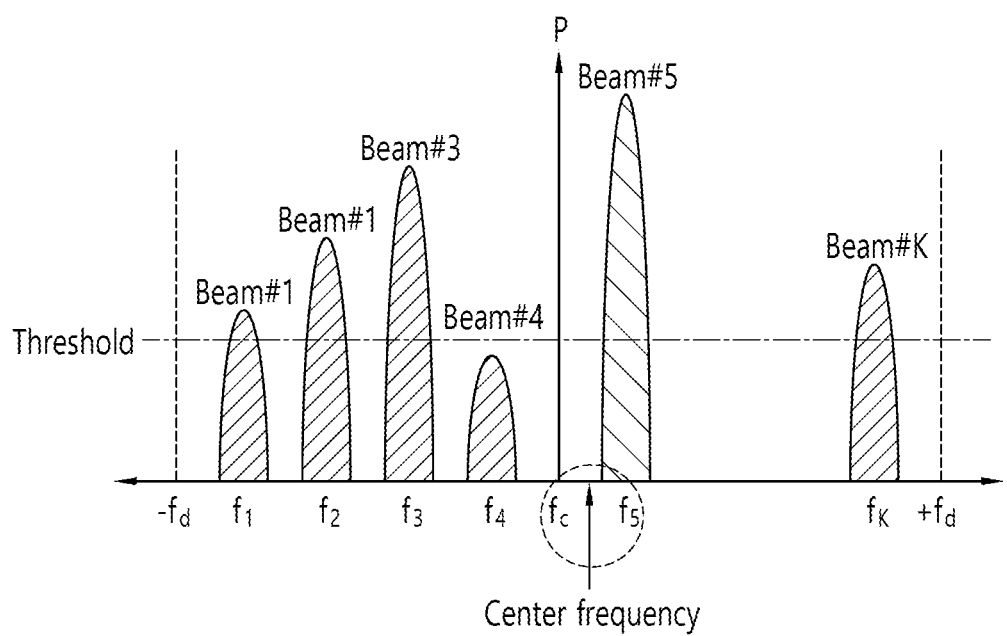
FIG. 13 shows another example of setting the frequency of the oscillator according to an embodiment of the present invention.

FIG. 13 shows another example of setting the frequency of the oscillator according to an embodiment of the present invention. The Doppler spectrum in FIG. 13 is the same as the Doppler spectrum in FIG. 12. Therefore, also in this embodiment, $f_{beam}=f_5$. The UE feeds the index information of the beam #5 back to the base station, and the base station can instruct the UE to set the frequency of the oscillator to $(f_c+f_5)/2$ based on the index information of the fed-back beam #5. Alternatively, the UE may set the frequency of the oscillator $(f_c+f_5)/2$ and feed it back to the base station.

(3) Correction of Doppler shift corresponding to the intermediate value between the first selected beam index and the second selected beam index: As another example, the frequency of the oscillator of the UE is set by correcting as the intermediate value between the Doppler frequency corresponding to the selected beam index, and the Doppler frequency corresponding to the second selected beam. In this case, the first selected beam index may be the beam having the largest received signal strength, and the second selected beam index may be the beam having the second largest received signal strength. That is, the finally set frequency of the oscillator is $fc'=(f_{beam\_best}+f_{beam\_2nd})/2$. In this case, $f_{beam\_best}$ is the Doppler frequency corresponding to the first selected beam index and $f_{beam\_2nd}$ is the Doppler frequency corresponding to the second selected beam index.

Figure 14:
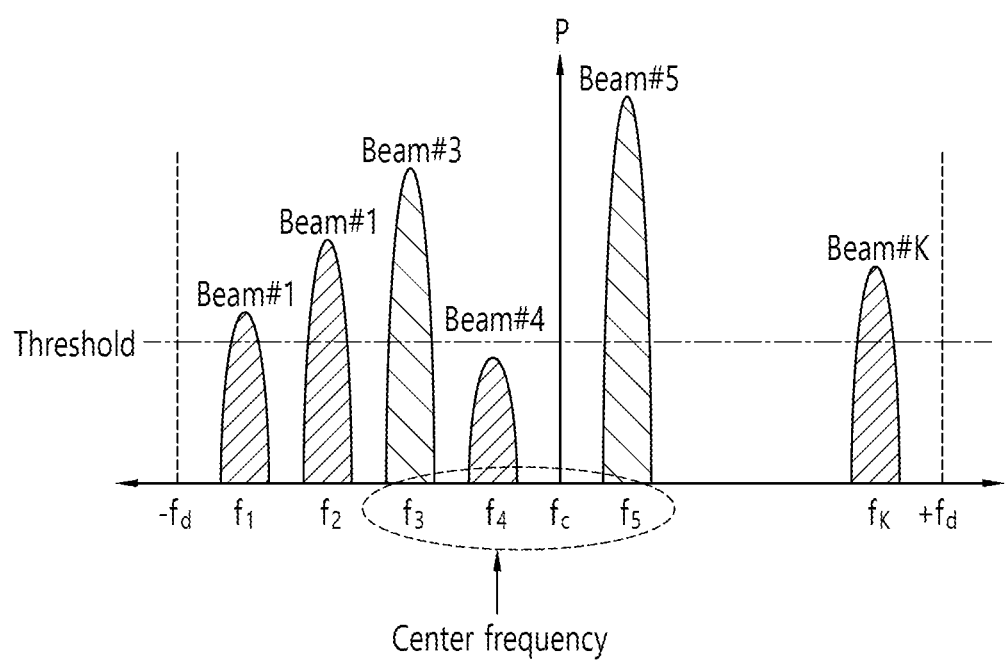
FIG. 14 shows another example of setting the frequency of the oscillator according to an embodiment of the present invention.

FIG. 14 shows another example of setting the frequency of the oscillator according to an embodiment of the present invention. The Doppler spectrum of FIG. 14 is the same as the Doppler spectrum of Table 12. Referring to FIG. 14, the beam index having the largest received signal strength is $f_{beam\_best}=f_5$ and the beam index having the second largest received signal strength is $f_{beam\_2nd}=f_3$. The UE feeds the index information of the beams #5 and #3 back to the base station, and the base station sets the frequency of the oscillator to $(f_5+f_3)/2$ based on the index information of the fed-back beams #5 and #3. Alternatively, the UE may set the frequency of the oscillator to $(f_5+f_3)/2$ and feed it back to the base station.

(4) Doppler shift correction corresponding to an average value of all beam indexes having a received signal strength equal to or greater than a specific reference value: As another example, the frequency of the oscillator of the UE is set by correcting as an average value of the Doppler frequencies corresponding to all beam indexes whose received signal strength is equal to or greater than a specific reference value, $P_{thredshold}$. That is, the finally set frequency of the oscillator is $fc'=(f_{beam\#1}+f_{beam\#2}+ \ldots +f_{beam\#K})/K_S$. In this case, $P_{beam\#1}, P_{beam\#2} \ldots P_{beam\#K} > P_{thredshold}$, and Ks is the total number of selected beams. In calculating the average value of the Doppler frequency corresponding to the index of the selected beam, an average value of the Doppler frequency may be calculated in consideration of the weight according to the strength of the received signal corresponding to the index of the selected beam.

Figure 15:
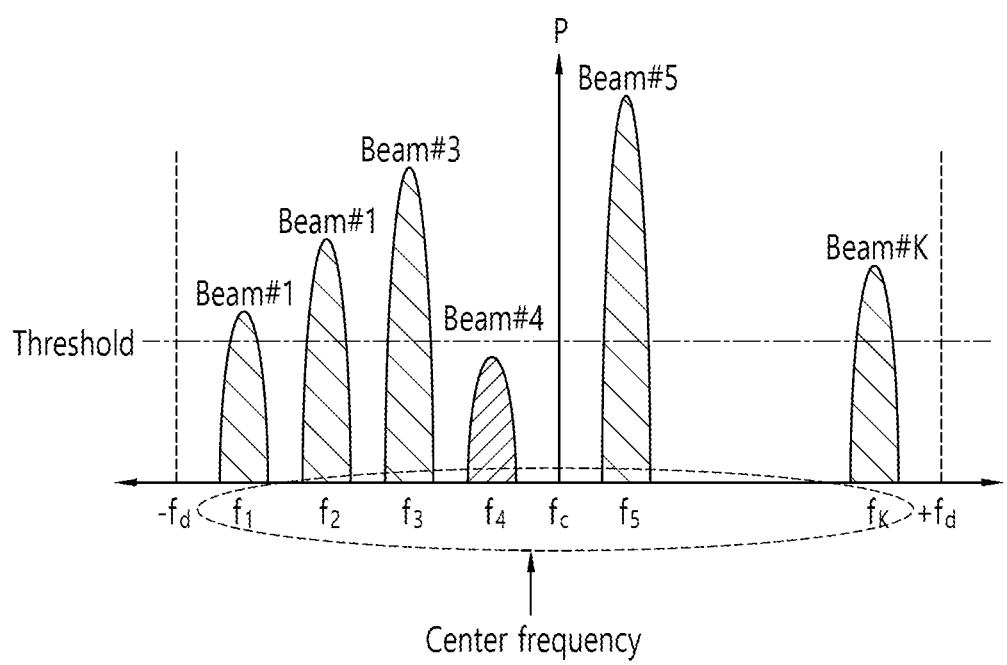
FIG. 15 shows another example of setting the frequency of an oscillator according to an embodiment of the present invention.

FIG. 15 shows another example of setting the frequency of an oscillator according to an embodiment of the present invention. The Doppler spectrum in FIG. 15 is the same as the Doppler spectrum of FIG. 12. Referring to FIG. 15, the index of the beam whose received signal strength is greater than the specific reference value $P_{thredshold}$ is beam #1, beam #2, beam #3, beam #5 . . . beam #K excluding beam #4. The UE feeds the index information of the remaining beams excluding the beam #4 back to the base station, and the base station instructs the UE to set the frequency of the oscillator to $(f_1+f_2+f_3+f_5+\ldots f_K)/Ks$. Alternatively, the UE may set the frequency of the oscillator to $(f_1+f_2+f_3+f_5+\ldots f_K)/Ks$ and feed it back to the base station.

Figure 16:
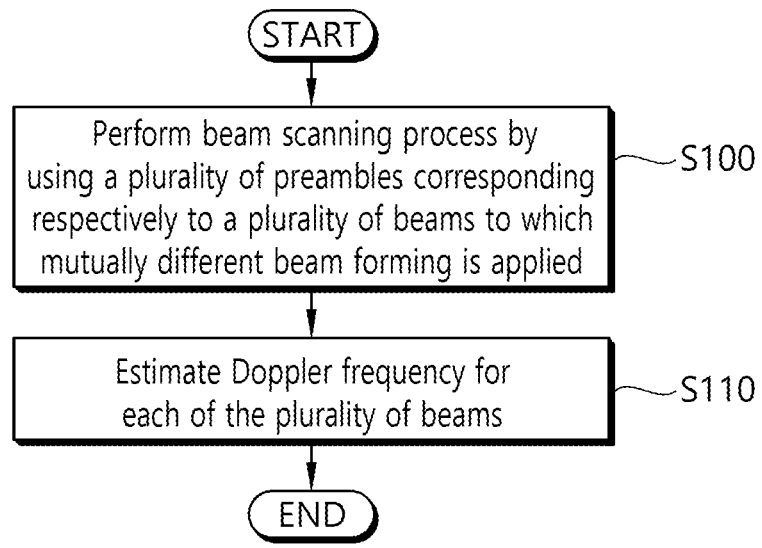
FIG. 16 shows a method of estimating the Doppler frequency according to an embodiment of the present invention.

FIG. 16 shows a method of estimating the Doppler frequency according to an embodiment of the present invention. The embodiments of the present invention described above may be applied to the embodiment of FIG. 16. The embodiment of FIG. 16 may be applied to a wireless communication system operating in the millimeter wave band.

In step S100, the receiver performs a beam scanning process by using a plurality of preambles corresponding to a plurality of beams to which different beam forming is applied. The plurality of preambles may correspond to each of beam forming directions of the plurality of beams. The plurality of preambles may be configured in the same subframe or may be configured in different subframes, respectively, in a time domain. The beam forming may also include at least one of analog beam forming, digital beam forming, or hybrid beam forming.

In step S110, the receiver estimates the Doppler frequency for each of the plurality of beams. The Doppler frequency for each of the plurality of beams may be directly estimated by calculating a Doppler spectrum in a preamble interval of each of the plurality of beams. Alternatively, instead of directly estimating the Doppler frequency for each of the plurality of beams, the Doppler frequency for each of the plurality of beams may be estimated based on the difference between and the center frequency and the CFO of each of the plurality of beams.

After estimating the Doppler frequency for each of the plurality of beams, the receiver may select at least one of the plurality of beams and set a frequency of the oscillator of the UE based on the estimated Doppler frequency for the selected at least one beam. The frequency of the receiver may be set by a transmitter or a receiver. The receiver may transmit information on the selected at least one beam to a transmitter. The receiver may receive the frequency of the oscillator of the receiver set by the transmitter from the transmitter based on the information on the selected at least one beam. Alternatively, the receiver can directly set the frequency of its oscillator.

The frequency of the oscillator of the receiver may be set in various ways, and the frequency of the oscillator of the receiver may be set according to the embodiment of FIGS. 12 to 15, as an example. For example, the selected at least one beam is the beam having the largest received signal strength among the plurality of beams, and the frequency of the oscillator of the receiver may be set to the Doppler frequency of the beam having the largest received signal strength. Alternatively, the selected at least one beam is the beam having the largest received signal strength among the plurality of beams, and the frequency of the oscillator of the receiver may be set as an intermediate value between the center frequency and the Doppler frequency of the beam having the largest received signal strength. Alternatively, the selected at least one beam is the beam having the largest received signal strength and having the second largest received signal strength among the plurality of beams, and the frequency of the oscillator of the receiver may be set as the Doppler frequency for the beam having the largest received signal strength and the Doppler frequency for the beam having the second largest received signal strength. Alternatively, the selected at least one beam is all beams whose received signal strength is equal to or greater than a specific reference value, and the frequency of the oscillator of the receiver may be set as the frequency of the Doppler frequency for all beams whose received signal strength is equal to or greater than a specific reference value.

In the above description of the present invention, it is assumed that a plurality of beams is transmitted from one antenna array, but this is only an example. The present invention may also be applied to a case where one beam is transmitted with some of the antenna array. In this case, each beam is applicable as a transmission beam of each sub-array.

Further, the present invention described above may be applied to any combination of the transmitter and receiver. The present invention may be applied to a downlink. The present invention may be applied to the uplink if the transmitter is the UE and the receiver is the base station. If both the transmitter and the receiver is the UE, and it may be applied to a sidelink.

In addition, the present invention may be applied to beam forming or precoding through analog or digital processing for multiple antennas. When the present invention is applied to a broadband system, the broadband can be divided into a specific frequency domain (e.g. subband, subcarrier, resource block, etc.) and a separate set of feedback information may be fed back to each frequency domain. Alternatively, the feedback information may be transmitted only for a specific frequency region selected by the UE or specified by the base station. The frequency domain may be composed of one or more regions that are continuous in a frequency domain, or one or more regions that are discrete in a frequency domain.

Figure 17:
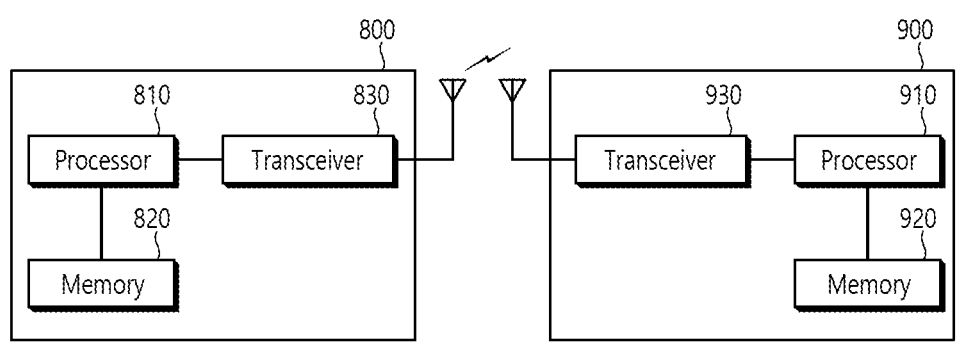
FIG. 17 shows a wireless communication system to implement an embodiment of the present invention.

FIG. 17 shows a wireless communication system to implement an embodiment of the present invention.

A BS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that implement the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for estimating a Doppler frequency by a receiver in a wireless communication system, the method comprising:
    performing, by the receiver, a beam scanning process by receiving a plurality of preambles, wherein each of the plurality of preambles is related to each of a plurality of beams to which different beam forming is applied; and
    estimating, by the receiver, the Doppler frequency per each of the plurality of beams based on a difference between a carrier frequency offset (CFO) of each of the plurality of beams and a center frequency,
    wherein each beam forming direction of the plurality of beams is set for each of the plurality of preambles, and
    wherein the CFO of each of the plurality of beams is calculated, by the receiver, using only each of the plurality of preambles, a length of cyclic prefix (CP), and an orthogonal frequency division multiplexing (OFDM) symbol period.

2. The method of claim 1, wherein the plurality of preambles is configured to the same subframe or a different subframe in a time domain.

3. The method of claim 1, further comprising:
    selecting at least one beam among the plurality of beams; and
    setting a frequency of an oscillator of the receiver based on the Doppler frequency estimated for the selected at least one beam.

4. The method of claim 3, wherein the selected at least one beam is a beam having a largest received signal strength among the plurality of beams, and
    wherein the frequency of the oscillator of the receiver is set as a Doppler frequency of the beam having the largest received signal strength.

5. The method of claim 3, wherein the selected at least one beam is a beam having a largest received signal strength among the plurality of beams, and
    wherein the frequency of the oscillator of the receiver is set as an intermediate value between a center frequency and a Doppler frequency of the beam having the largest received signal strength.

6. The method of claim 3, wherein the selected at least one beam is a beam having a largest received signal strength and a second largest received signal strength among the plurality of beams, and
    wherein the frequency of the oscillator of the receiver is set as an intermediate value between a Doppler frequency of the beam having the largest received signal strength and a Doppler frequency of the beam having the second largest received signal strength.

7. The method of claim 3, wherein the selected at least one beam is all beams having a received signal strength equal to or greater than a specific reference value, and
    wherein the frequency of the oscillator of the receiver is set as an average value of Doppler frequencies of all beams having the received signal strength equal to or greater than the specific reference value.

8. The method of claim 3, further comprising:
    transmitting information on the selected at least one beam to a transmitter.

9. The method of claim 8, further comprising:
    receiving a frequency of the oscillator of the receiver, which is set by the transmitter based on the information on the selected at least one beam, from the transmitter.

10. The method of claim 1, wherein the beam forming includes at least one of analog beam forming, digital beam forming, or hybrid beam forming.

11. The method of claim 1, wherein the wireless communication system is operated in a millimeter wave bandwidth.

12. A receiver in a wireless communication system, the receiver comprising:
    a memory;
    a transceiver; and
    a processor, coupled to the memory and the transceiver, that:
    performs a beam scanning process by receiving, via the transceiver, a plurality of preambles, wherein each of the plurality of preambles is related to each of a plurality of beams to which different beam forming is applied, and
    estimates a Doppler frequency per each of the plurality of beams based on a difference between a carrier frequency offset (CFO) of each of the plurality of beams and a center frequency,
    wherein each beam forming direction of the plurality of beams is set for each of the plurality of preambles, and
    wherein the CFO of each of the plurality of beams is calculated, by the receiver, using only each of the plurality of preambles, a length of cyclic prefix (CP), and an orthogonal frequency division multiplexing (OFDM) symbol period.

* * * * *